United States Patent

Benninghoven et al.

[11] Patent Number: 6,107,629
[45] Date of Patent: Aug. 22, 2000

[54] METHOD TO DETERMINE DEPTH PROFILES IN AN AREA OF THIN COATING

[76] Inventors: Alfred Benninghoven, Koesters Kaempken 30, D-48161, Muenster; Ewald Niehuis, Erlengrund 323, D-48308, Senden, both of Germany

[21] Appl. No.: 09/077,508
[22] PCT Filed: Oct. 13, 1997
[86] PCT No.: PCT/EP97/05632
  § 371 Date: Dec. 14, 1998
  § 102(e) Date: Dec. 14, 1998
[87] PCT Pub. No.: WO98/16948
  PCT Pub. Date: Apr. 23, 1998

[30] Foreign Application Priority Data

Oct. 11, 1996 [EP] European Pat. Off. ............ 196 41 981

[51] Int. Cl.[7] .................................................. H01J 37/26
[52] U.S. Cl. ........................................... 250/309; 250/398
[58] Field of Search .................................... 250/251, 398, 250/309, 492–21

[56] References Cited

U.S. PATENT DOCUMENTS

| | | | |
|---|---|---|---|
| 4,368,099 | 1/1983 | Huggett et al. | 156/628 |
| 4,559,096 | 12/1985 | Friedman et al. | 250/398 |
| 4,611,120 | 9/1986 | Bancroft et al. | 250/309 |
| 4,874,946 | 10/1989 | Kazmerski | 250/309 |
| 5,442,174 | 8/1995 | Kataoka et al. | 250/309 |
| 5,689,112 | 11/1997 | Enge et al. | 250/309 |

*Primary Examiner*—Bruce C. Anderson
*Attorney, Agent, or Firm*—Milde, Hoffberg & Macklin, LLP

[57] ABSTRACT

The invention relates to a method to determine depth profiles in an area of thin coating of solid substrates comprising the following steps: producing an ion beam with a substantial amount of ions having a molecular weight above 32 and consisting of at least 3 atoms; focusing the ion beam on the substrate surface whereby ions break down into two components upon impact and impact energy of the individual atoms or molecular fragments is sufficient for the removal of the upper coating as defined and interaction of particles bombarded by the solid body does not lead to a coating to be formed; removing defined surface coatings by an ionic beam sputter process; determining of concentration of sputtered components removed from the substrate surface by means of a measuring probe with a measuring and evaluation circuit connected downstream.

3 Claims, 4 Drawing Sheets

METHOD TO DETERMINE DEPTH PROFILES IN AN AREA OF THIN COATING

BACKGROUND OF THE INVENTION

The present invention concerns a method of determining the contour of a depression in the thin-layer region of a solid substrate. The method comprises generating a beam of ions from a starting substance converted to either a gas phase or a vapor phase, deflecting the beam to the surface of the substrate, removing defined layers of the surface by ion-beam sputtering, and determining by means of a probe and a downstream detection-and-processing circuit the concentration of the components removed from the surface.

The determination of depression contours is an analytic task of significance to the overall field of surfacing and coating not only in research and development but also in the control of production and fabrication. Layers as thick as single atoms are removed in the Z direction and the concentration in the flow of removed particles or particular surface layer exposed are measured with special probes as the removal progresses. Examples are the distribution of the element boron (B) in silicon (Si) or of aluminum (Al) in gallium arsenide (GaAs). Depression-contour analysis is of particular importance in micro-electronics, where the distribution of the doping element, in single silicon crystals for example, or the composition of interfaces, in gallium-arsenide layers for example, are measured. High depth resolution and sensitivity are significant requisites.

The aforesaid method combines the continuous breakdown of the surface by ion-beam sputtering, ion-bombardment dusting in other words, with the most sensitive and continuous determination of the particular composition of the surface of the components of interest. The surface of the particular solid substrate being analyzed is removed as uniformly as possible with an appropriate ion beam. The rate of removal can be determined empirically and depends with considerable reproducibility on the homogeneity of the beam's current density, on the type of ion and energy, and on the material itself. Inclusions in the material do not generally much affect the rate of removal if at all.

Uniform removal can be ensured either through the homogeneity of the beam's current density or by scanning the area to be removed with a tightly bundled beam. A primary scanning ion beam erodes the surface. The particular surface composition is then continuously determined inside the resulting crater with a secondary ion mass spectrometer (SIMS). The deep distribution of the individual components can then be determined with the known and common combination of sputtering and SIMS analysis.

State-of-the-art sputtering is carried out with ions of the inert gases, of cesium, or of diatomic oxygen.

Along with actual removal, a surface-sensitive probe will also detect the concentration of interesting components in whatever surface is exposed. The result is a specific concentration $c=f(z)$ of the components in question at every exposed depth z. Depth z can itself be both calculated from the intensity of the beam. From the area density j of the beam, that is, and determined by a concomitant method, specifically by mechanically determining the depth of the crater. The reproducibility and unambiguousness of depth determination are ensured empirically.

Probes appropriate for the present method are also known. The methods employed with such probes can determine the surface concentration of one or more components with sufficient sensitivity. The methods appropriate for such purposes include for example Auger electron spectroscopy, photo-electron spectroscopy, and especially the various types of surface mass spectroscopy. The probe should to the greatest extent possible address only the uppermost layer of atoms. In that event, the depth resolution will be limited only by the uniformity of removal, corresponding to the ion bombardment. The uniformity of solids removal by the particular ion beam employed will accordingly determine the attainable depth resolution $f(z)$ of the overall process if the probe's information depth is assumed as a determinative parameter.

The ionic bombardment not only removes particles from the surface. It also results in intermingling between regions in the vicinity of the surface that the ion beam can enter with a certain probability, a intermingling that is detrimental to the precision of the deep-contour analysis. Assuming that a closed layer of atoms of a foreign element is included to a specific depth $z_1$ in the solid material, the original and true depth distribution will correspond to a rectangle in the concentration graph $c=f(z)$.

The action (transmission of energy and pulse) of the beam of ions penetrating the surface region will, however, result in such intermingling even before the layer of foreign element has been exposed. This intermingling will diffuse the actual contour detected by the probe. The contour's resolution is accordingly inherently limited, and one object of the present invention is to minimize the intermingling.

The use of ions for the destructive analysis of depression contours is accordingly known. The ions are of the lowest possible energy and the largest possible mass and impact the surface to be removed at the most acute angle possible. If, as is common, the ions are $Ar^-$ ions with an energy E of 1 keV, the angle e of impact will be 70° to ensure the best possible constellation of parameters.

Any additional decrease in bombardment energy E will lead to problems in that their space charges make ion sources very difficult to focus at low energies, limiting the potential for scanning with a narrow beam. Furthermore, since the current densities, and hence the energies available for sputtering per unit of area and time, are all low, it takes much too long to measure a specific depth z.

SUMMARY OF THE INVENTION

The object of the present invention is accordingly to eliminate the aforesaid drawbacks and essentially improve depth resolution at relatively brief measurement times.

This object is attained in accordance with the present invention in a method of the aforesaid type in that the beam includes a substantial portion of ions consisting of at least three atoms and with a molecular weight greater than 32 that break down into at least two components as they impact the surface of the substrate, whereby the impact energy of the individual atoms or molecular fragments is high enough to remove a definite amount of surface layer without the interaction between the bombarding particles and the solid material building up a layer.

Thus, the ions employed to destroy the surface are not single-atom ions but ions of several and at least three atoms that can be singly or multiply charged. Such multiple-atom ions will "burst" as they impact the surface of the solid material that is to be removed. They will impact in the form of individual atoms at approximately the speed of the original molecular ions. The mass of the individual ions, however, is lower than that of the molecular ions, and their kinetic energy is accordingly lower. They do not penetrate very far into the material and lose little energy as they individually impact it. There will accordingly be less intermingling of layers.

There are two ways to determine the concentration of the exposed surfaces. First, the secondary ions, meaning ions or neutral particles suspended in the ion beam by laser re-ionization for example, can be analyzed. The preferred approach, however, is to generate another ion beam for purposes of analysis at the particular exposed surface with an appropriate auxiliary probe.

Bombardment ions that comprise at least three atoms can basically be generated by electron-impact ionization of molecules of gas. One example of the many such ions that can be employed is the $SF_5^+$ that predominates subsequent to the electron-impact ionization of $SF_5$. Although such gases or ions are employed on an industrial scale, it has not been realized that using them in accordance with the present invention can considerably improve depth resolution. There are actually thousands of such molecules that can be ionized in this way. The molecular ions employed in the present invention will essentially improve depth resolution when a secondary-ion mass spectrometer is employed.

The present invention will now be specified by example and with reference to the accompanying drawing,

BRIEF DESCRIPTION OF THE INVENTION

FIG. 2 is a schematic illustration of the principle the present invention is based on.

DESCRIPTION OF THE PREFERRED EMBODIMENT

Figure 2:
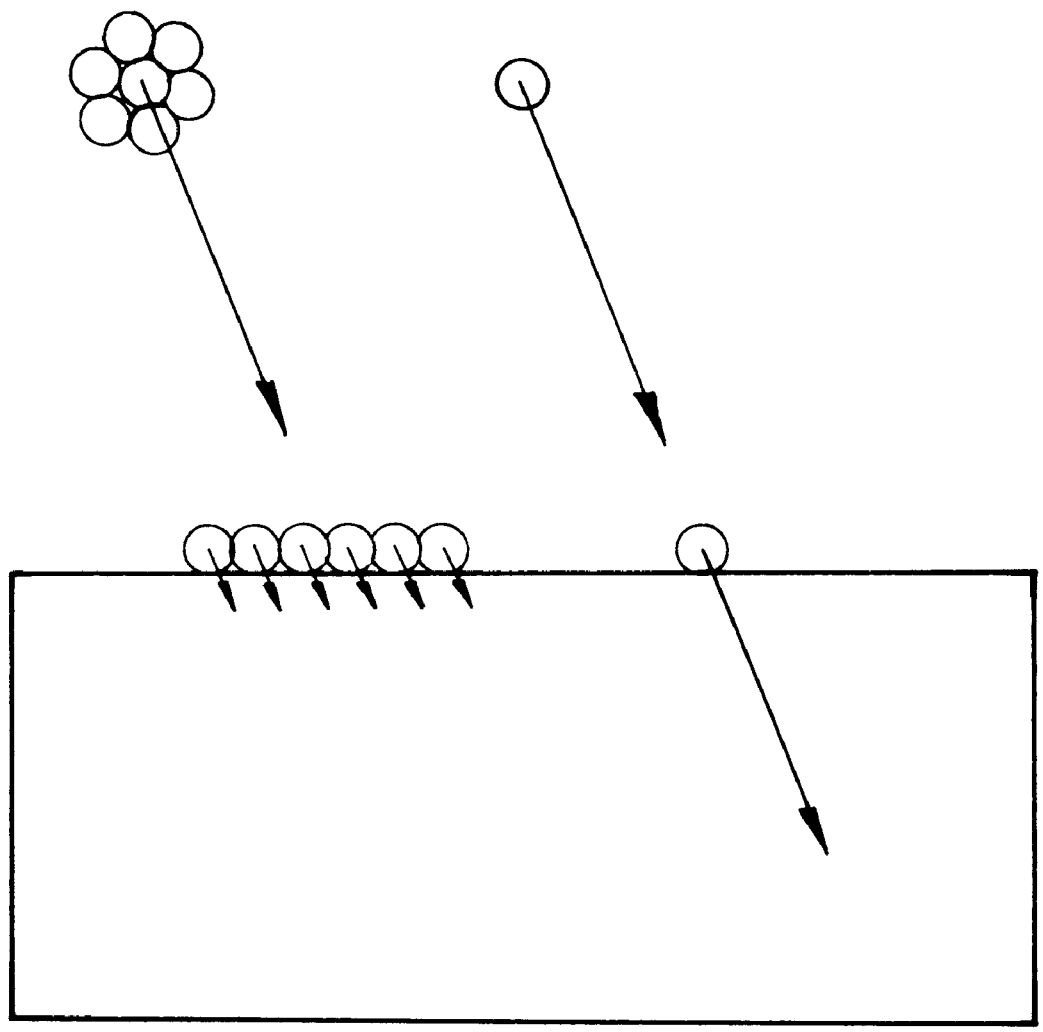

FIG. 2 is a schematic illustration of the principle the present invention is based on, If a single-atom ion 10 with a mass M is considered a bombardment ion, it can be compared with a molecular ion 20 of the same mass M comprising n (7 in the present case) individual atoms. Both ions are assumed to have an elementary change $e_0$ and to have traversed the same acceleration potential U, so that they will have the same kinetic energy $e_0 \cdot U$ upon impact. This situation is illustrated in FIG. 2.

The single-atom ion 10 of mass M will enter the surface with all its energy $E_0 = e_0 \cdot U$, penetrating to a depth z corresponding to that energy, surrendering a considerable amount to the atoms of the solid material, and accordingly resulting in a correspondingly considerable intermingling of layers and contaminating the depth contour.

A molecular ion 20 of n=7 particles but of equal energy $e_0 \cdot U$ on the other hand will transmit its energy entirely differently. Such an ion will disintegrate at the instant of impact into six particles of mass $m_1, m_2, \ldots m_6$. The total energy $e_0 \cdot U$ will be distributed among the individual particles. The kinetic energy of atom i results from all n atoms having at the moment of impact the same velocity: [lacuna].

Appropriate molecular ions with energies of 100 to a few 1000 eV will accordingly result in individual atoms or molecular fragments of sufficient energy that can be transported and focused in the form of total molecular ions by the ion-optical system in question.

A simultaneous accomplishment is that only a fraction $(m_1/M)$ of the ionic energy will act in the form of impact energy with respect to the atoms or molecular fragments that break down the surface. The depth of penetration and the transmission of energy will be accordingly minor. The less powerful intermingling will increase the capacity for depth resolution.

The ion beam can be generated for example by the electron-impact ionization of $SF_6$ molecules. About 75% of the resulting ions will be $SF_5^+$ ions that disintegrate upon impact into separate atoms of correspondingly lower energy.

The present invention will now be specified with reference to examples.

EXAMPLE 1

Figure 1:
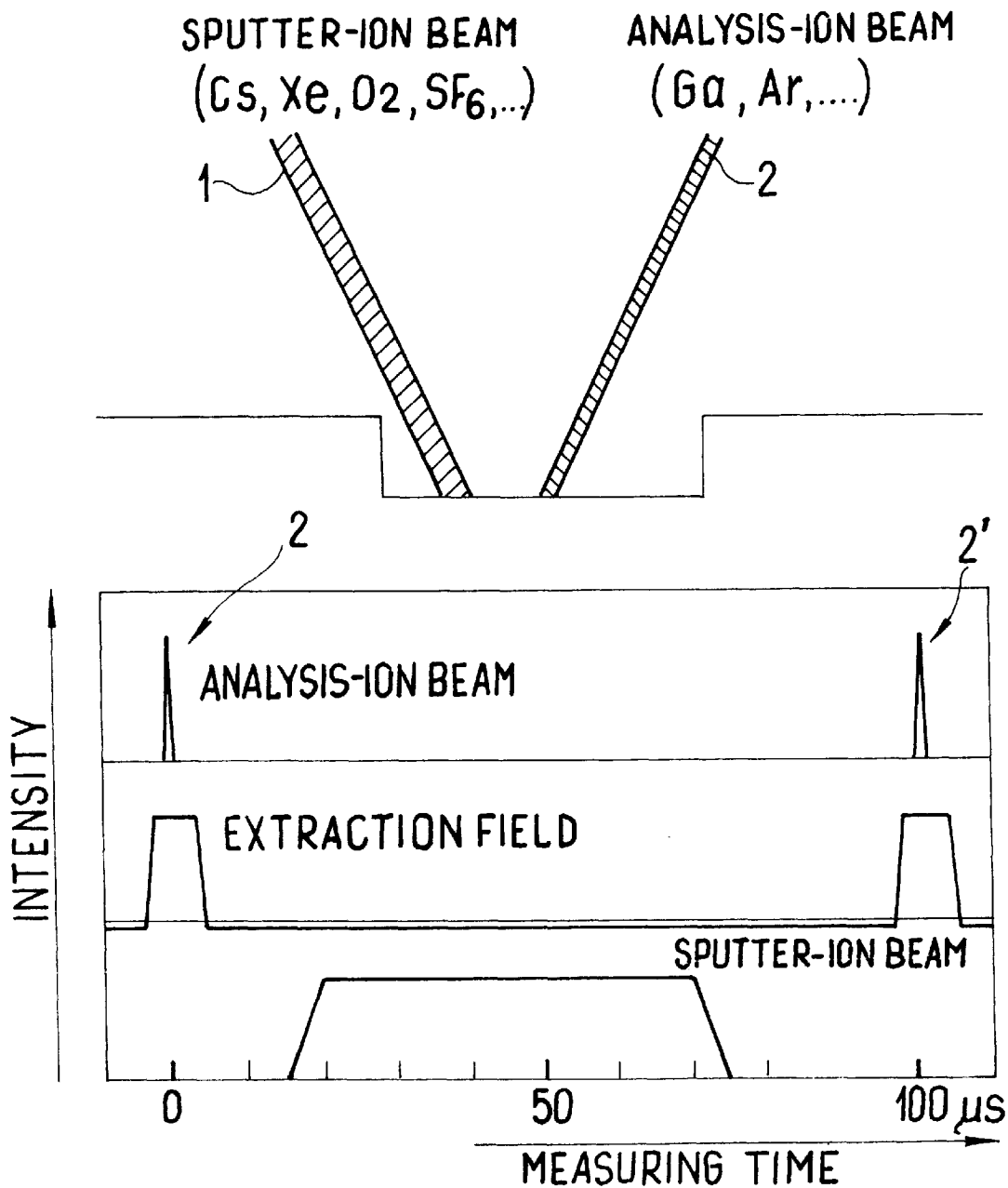
FIG. 1 is a schematic illustration of testing-and-measurement apparatus employ in conjunction with the present invention.

Two beams are employed with time-of-flight secondary-ion mass spectroscopy (TOF-SIMS). FIG. 1 illustrates the method. There is one source of ions for the sputtering beam and another for the analysis beam. Both such "guns" repeat at the same rate. The surface is destroyed with a pulsed and focused beam (of $Ar^+$ or $SF_5^+$) that scans an area of 200×200 $\mu$m. The probe is an independent pulsed and focused primary $Ar^+$ beam that impacts the surface at the center of the bombardment crater. Sputtering-ion beam 1 turns on during the intervals between two cycles 2 and 2' of the analysis-ion beam, and the extraction field is always off between the times when the analysis-ion beam is on. The time of flight of the secondary ions generated by the analysis beam can accordingly be exploited by a process that is in itself known to analyze them.

A silicon sample manufactured by Phillips-Research, Eindhoven was employed to determine the effect of the sputtering parameters type of ion, ion energy, and angle of impact on depth resolution, Boron ions were implanted in the native oxide of a silicon wafer at 100 eV and covered with a layer of amorphous silicon dioxide. The implantation dosage was established at $1.6 \cdot 10^{14}/cm^2$. The maximal number of boron atoms was located at a depth of 17.3 nm by TOF-SIMS using a Cameca IMS 4f magnetic sector-field instrument and crater contouring.

The sample was measured with various species of sputtering ions and at various ion energies and angles of impact. The sample could be tilted 21° without significant transmission loss. The sample was flushed with oxygen during every measurement. A secondary $Si^+$ ion yield as high as that of silicon dioxide itself was obtained.

Figure 3:
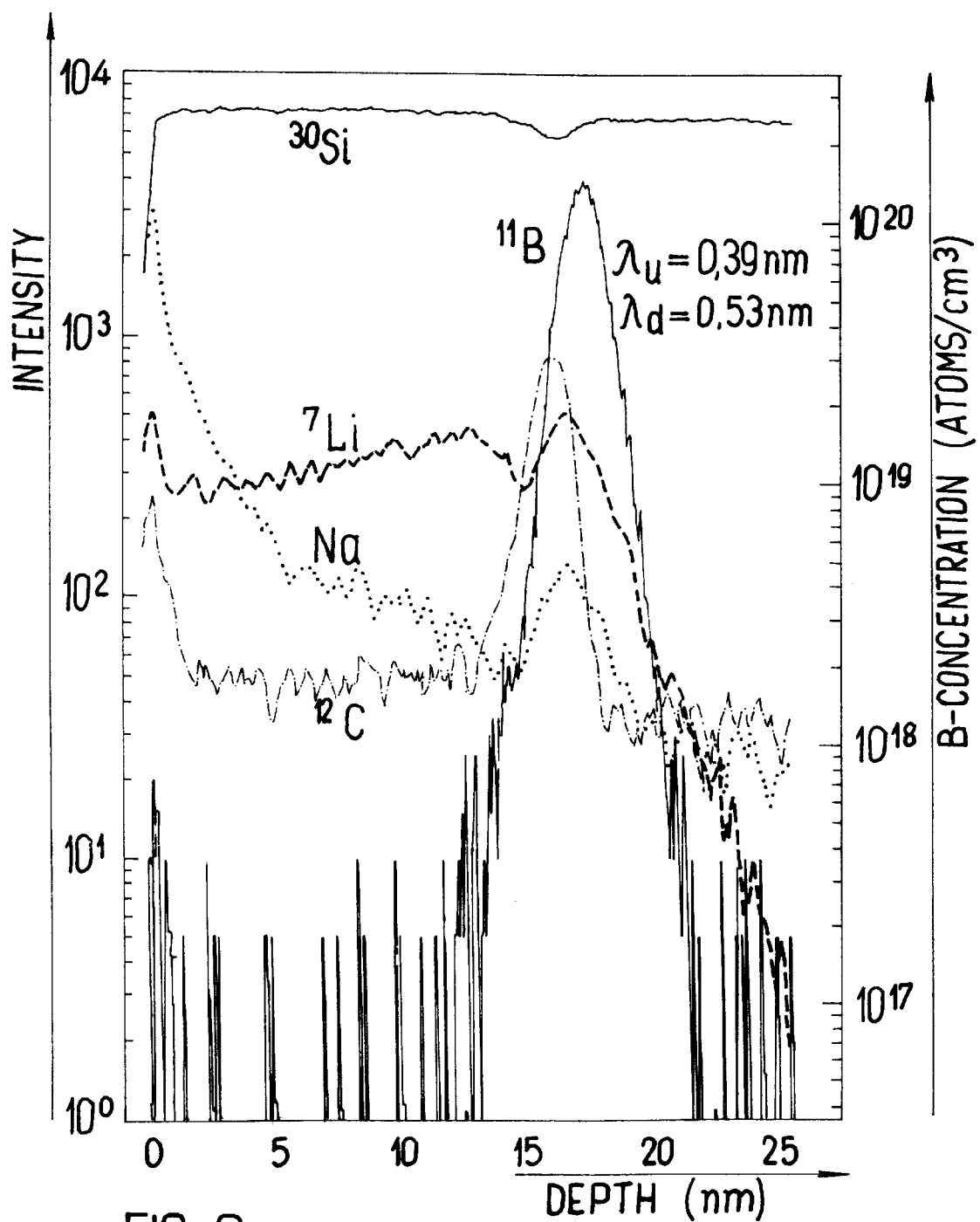
FIG. 3 is a depth contour obtained for purposes of implantation.

FIG. 3 illustrates the measured concentrations of atoms. The figure is a TOF-SIMS depth contour produced by 600 eV $SF_5$-ion sputtering at an angle of impact of 52.5°. The depth of 30 nm was obtained in 50 minutes of sputtering. A scale of concentration with a boron-detection limit of $5 \cdot 10^{16}$ atoms/cm$^3$ was derived from the known boron-implantation dose. The width of the transition region wherein no sputtering equilibrium could be obtained is very small. The $Si^+$ signal (mass-30 isotope) stabilizes even at a depth of 0.8 nm.

The wafer's original surface with the 100-eV boron atoms implanted in it is indicated by maxima in the alkali and carbon signals. The $^{30}Si^+$ signal exhibits in accordance with such contamination a minimum at atomic weight 30.

Comparison of the results obtained with $O_2^+$ or $SF_5^+$ particles reveals that those obtained with $SF_5^+$ are essentially better. The sulfur atom in a molecular ion like $SF_5^+$ is responsible for 25% (150 eV) and the fluorine atoms for only 19% (90 eV) of the radiant energy of 600 eV. This explains why satisfactory depth resolution can be achieved with molecular sputtering with ionic particles with a higher molecular weight and comprising at least three atoms.

EXAMPLE 2

Sputtering with $SF_6$ also provides high depth resolution for the aluminum atoms in laminated layers of AlGaAs.

Figure 4:
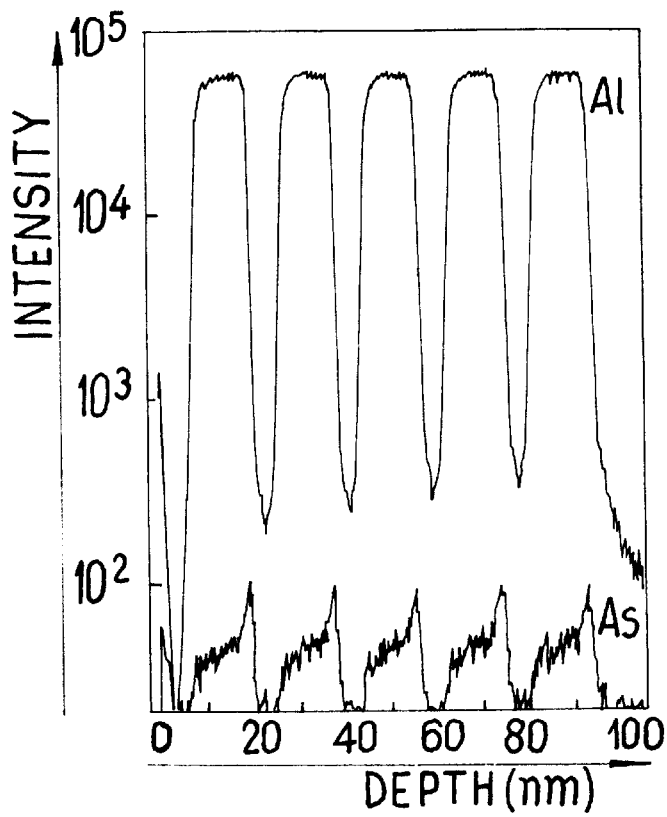
FIGS. 4 and 5 are depth contours obtained from GaAs materials.

FIG. 4 is a depth contour representing the sputtering of $SF_6$ onto several layers of AlAs and GaAs at 600 eV—one 6.7 mm layer of GaAs, five 9.9 nm layers of AlAs, and five 8.8 nm layers of GaAs on a substrate of GaAs. The high depth resolution is demonstrated by the aluminum signal, which decreases steeply over 2 decades in the GaAs layer due to the molecular low-energy sputtering such that the expected sequences of layers are not evident.

EXAMPLE 3

Figure 5:
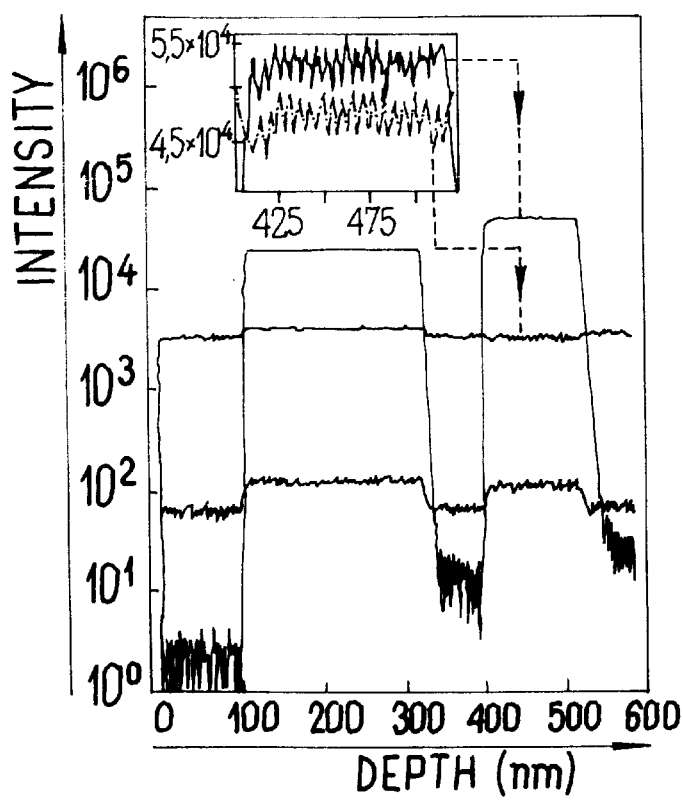

FIG. 5 shows a depth contour obtained from another lamination, specifically a system composed of AlGaAs and GsAs—105 nm of GaAs, 215 nm of AlAs, 85 nm of GaAs, and 19 layers of 3 nm of AlGaAs and 3 nm of GaAs each on a GaAs substrate. The sputtering was carried out with $SF_6$ at 1 keV. High resolution to a depth of at least 500 nm was obtained in 65 minutes. This resolution was good enough to separate out the aluminum-layer sequences at a depth of 405 to 520 nm. The amplitude of the signal oscillation is limited by the quality of the sample in that the aluminum layers themselves are not sharp.

Depth contour analysis is accordingly intended to fulfill two functions

1. The most uniform disintegration possible of surface layers by molecular ions, the object of the present invention, and 2. The practically simultaneous determination of the instantaneous composition, as far as possible in the vicinity of the outermost layer of atoms, by, as aforesaid, a single-beam or two-beam method.

There has thus been shown and described a novel method to determine depth profiles in an area of thin coating which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a method of determining the contour of a depression in the thin-layer region of a solid substrate comprising the steps of generating a beam of ions from a starting substance converted to either a gas phase or a vapor phase, deflecting the beam to the surface of the substrate, removing defined layers of the surface by ion-beam sputtering, and determining by means of a probe and a downstream detection-and-processing circuit the concentration of the components removed from the surface, the improvement wherein the beam includes a substantial portion of ions consisting of at least three atoms and with a molecular weight greater than 32 that break down into at least two components as they impact the surface of the substrate, whereby the impact energy of the individual atoms or molecular fragments is high enough to remove a definite amount of surface layer without the interaction between the bombarding particles and the solid material building up a layer.

2. The method defined in claim 1, wherein the individual atoms or molecular fragments have an energy of between 100 and 3000 eV.

3. The method defined in claim 1 wherein the beam includes a substantial proportion of $SF_5^+$ ions that disintegrate into separate atoms upon impact.

* * * * *